(12) United States Patent
Brown et al.

(10) Patent No.: US 8,495,503 B2
(45) Date of Patent: *Jul. 23, 2013

(54) INDICATING THE CONTEXT OF A COMMUNICATION

(75) Inventors: Michael Wayne Brown, Georgetown, TX (US); Michael A. Paolini, Austin, TX (US); Newton James Smith, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2675 days.

This patent is subject to a terminal disclaimer.

(21) Appl. No.: 10/185,343

(22) Filed: Jun. 27, 2002

(65) Prior Publication Data

US 2004/0001090 A1    Jan. 1, 2004

(51) Int. Cl.
*G06F 3/00* (2006.01)
(52) U.S. Cl.
USPC ............. 715/752; 715/733; 704/9; 709/203
(58) Field of Classification Search
USPC ............. 715/528, 529, 536, 539, 540, 752, 715/522–524
See application file for complete search history.

(56) References Cited

U.S. PATENT DOCUMENTS

| | | | | |
|---|---|---|---|---|
| 4,831,583 A | * | 5/1989 | Pascoe | 715/524 |
| 4,870,579 A | * | 9/1989 | Hey | 705/27 |
| 5,293,473 A | * | 3/1994 | Hesse et al. | 715/529 |
| 5,508,718 A | * | 4/1996 | Haikin | 345/601 |
| 5,526,443 A | | 6/1996 | Nakayama | |
| 5,696,981 A | * | 12/1997 | Shovers | 704/10 |
| 5,781,879 A | * | 7/1998 | Arnold et al. | 704/9 |
| 5,802,533 A | * | 9/1998 | Walker | 715/529 |
| 5,812,126 A | | 9/1998 | Richardson et al. | 345/330 |
| 5,835,922 A | * | 11/1998 | Shima et al. | 715/522 |
| 5,880,731 A | | 3/1999 | Liles et al. | 345/349 |
| 5,918,238 A | * | 6/1999 | Hayashi | 715/526 |

(Continued)

FOREIGN PATENT DOCUMENTS

| | | |
|---|---|---|
| JP | 2001-216228 | 8/2001 |
| JP | 2002-064564 | 2/2002 |

(Continued)

OTHER PUBLICATIONS

Microsoft, Microsoft Word 2000, 1999, Microsoft Corporation, 9.0.6926 SP-3.*

(Continued)

*Primary Examiner* — Alvin Tan
(74) *Attorney, Agent, or Firm* — Matthew W. Baca; Amy J. Pattillo

(57) ABSTRACT

A method, system, and program for indicating a reaction response associated with the content of a communication to provide a context for the communication are provided. The content of a communication and the reaction responses to a communication provide the context for a communication. Varying portions of the content of a communication are analyzed to identify a particular reaction response associated with each of the varying portions of content. During a display of the content of the communication, a color within any of the varying portions indicates the associated reaction response. A reaction response may indicate a sender's intended response or an anticipated or actual response of a recipient. The colors may be added to a proposed communication and edited by a sender to achieve a particular desired response.

3 Claims, 11 Drawing Sheets

U.S. PATENT DOCUMENTS

| | | | |
|---|---|---|---|
| 5,974,262 A * | 10/1999 | Fuller et al. | 710/18 |
| 6,031,549 A | 2/2000 | Hayes-Roth | 345/474 |
| 6,064,383 A | 5/2000 | Skelly | 345/339 |
| 6,069,622 A | 5/2000 | Kurlander | 345/330 |
| 6,085,201 A * | 7/2000 | Tso | 715/505 |
| 6,161,130 A * | 12/2000 | Horvitz et al. | 709/206 |
| 6,232,966 B1 | 5/2001 | Kurlander | 345/330 |
| 6,253,167 B1 | 6/2001 | Matsuda et al. | 703/11 |
| 6,292,198 B1 | 9/2001 | Matsuda et al. | 345/473 |
| 6,314,411 B1 | 11/2001 | Armstrong | 706/11 |
| 6,329,994 B1 | 12/2001 | Gever et al. | 345/473 |
| 6,331,861 B1 | 12/2001 | Gever et al. | 345/629 |
| 6,332,143 B1 * | 12/2001 | Chase | 707/100 |
| 6,353,813 B1 | 3/2002 | Breese et al. | |
| 6,359,622 B1 | 3/2002 | Hayes-Roth | 345/474 |
| 6,405,225 B1 * | 6/2002 | Apfel et al. | 715/210 |
| 6,523,001 B1 * | 2/2003 | Chase | 704/10 |
| 6,529,864 B1 * | 3/2003 | Chase | 704/9 |
| 6,547,831 B1 * | 4/2003 | Kueny | 715/522 |
| 6,574,614 B1 | 6/2003 | Kesel | |
| 6,622,140 B1 * | 9/2003 | Kantrowitz | 707/5 |
| 6,655,963 B1 | 12/2003 | Horvitz et al. | |
| 6,707,472 B1 * | 3/2004 | Grauman | 715/752 |
| 6,711,585 B1 | 3/2004 | Copperman et al. | |
| 6,718,367 B1 * | 4/2004 | Ayyadurai | 709/206 |
| 6,718,368 B1 * | 4/2004 | Ayyadurai | 709/206 |
| 6,721,734 B1 * | 4/2004 | Subasic et al. | 707/5 |
| 6,725,227 B1 * | 4/2004 | Li | 707/102 |
| 6,876,728 B2 * | 4/2005 | Kredo et al. | 379/88.17 |
| 6,897,867 B2 * | 5/2005 | Katayama | 345/440 |
| 6,941,466 B2 | 9/2005 | Mastrianni | |
| 6,999,914 B1 * | 2/2006 | Boerner et al. | 704/1 |
| 7,137,070 B2 | 11/2006 | Brown et al. | |
| 7,289,949 B2 * | 10/2007 | Warner et al. | 704/9 |
| 2001/0049597 A1 | 12/2001 | Klipstein | |
| 2002/0002460 A1 * | 1/2002 | Pertrushin | 704/270 |
| 2002/0010723 A1 * | 1/2002 | Nielsen | 707/529 |
| 2002/0107726 A1 * | 8/2002 | Torrance et al. | 705/12 |
| 2002/0124027 A1 * | 9/2002 | Krueger et al. | 707/528 |
| 2002/0138271 A1 | 9/2002 | Shaw | |
| 2003/0110450 A1 * | 6/2003 | Sakai | 715/529 |
| 2004/0205616 A1 * | 10/2004 | Rosenberg et al. | 715/523 |
| 2004/0205631 A1 * | 10/2004 | Keohane et al. | 715/526 |
| 2004/0225640 A1 | 11/2004 | Brown et al. | |

FOREIGN PATENT DOCUMENTS

| | | |
|---|---|---|
| JP | 2002117027 | 8/2002 |
| WO | 0155903 A | 8/2001 |
| WO | 0241191 A | 5/2002 |
| WO | 0244991 A | 6/2002 |

OTHER PUBLICATIONS

The American Heritage Dictionary of the English Language, database, Copyright 2000, Houghton Mifflin Company, Fourth Edition, http://www.bartleby.com/61/53/D0035300.html.*

NET Messenger Service—Features http://messenger.msn.com/support/features2.asp, Apr. 8, 2002.

Dr. Internut's Internet 101 Help Clinic http://www.lake-online.com/internut/emot.html, Apr. 8, 2002.

IOP http://www.ewu.edu/TechRes/IR/onpoint/Vol4Issue5.html, Apr. 8, 2002.

In Focus http://www.imagenetinc.com, $2^{nd}$ Quarter 2001.

AppleScript Primer: Colorful Language http://maccentral.macworld.com/news/9912/15.briggs.shtml, Apr. 8, 2002.

Mac Efficiency 101: Email—Say it with Feeling http://maccentral.macworld.com/news/9912/15.deb.shtl, Apr. 8, 2002.

IBM, Context Searchable Communications, 85 Pages, co-pending filing date.

IBM Sampling Repsonses to Communication Content for Use in Analyzing Reaction Responses to Other Communications, 101 Pages, co-pending filing date.

Final Office Action, U.S. Appl. No. 10/185,296, filed Jun. 27, 2002, Michael Wayne Brown, mailing date Aug. 8, 2005, 15 pages.

Non-final Office Action, U.S. Appl. No. 10/185,296, filed Jun. 27, 2002, Michael Wayne Brown, mailing date Mar. 2, 2005, 14 pages.

Non-final Office Action, U.S. Appl. 10/185,117, filed Jun. 27, 2002, Michael Wayne Brown, mailing date Jul. 25, 2005, 26 pages.

Final Office Action, U.S. Appl. No. 10/185,117, filed Jun. 27, 2002, Michael Wayne Brown, mailing date Jan. 9, 2006, 24 pages.

Notice of Allowance, U.S. Appl. No. 10/185,117, filed Jun. 27, 2002, Michael Wayne Brown, mailing date Aug. 7, 2006, 7 pages.

International Search Report for WO 2004/004271A3, published Jan. 8, 2004, 4 pages.

* cited by examiner

```
INDIVIDUAL RESPONSE PROFILE 84

SARAH JANE

WORDS
LOVELY              AFFECTION
Y'ALL               --- UNEDUCATED
TAXES               BAD TOPIC

PHRASES
KICK THE BUCKET     - OFFENSIVE

GREETINGS
HELLO               APPROPRIATE
DEAR                + APPROPRIATE
NONE                -- OFFENSIVE
HI                  OFFENSIVE

TOPICS
BASEBALL            +++STRONGLY
                       LIKE
```

FIGURE 6

```
REGIONAL RESPONSE PROFILE 86

TX, U.S.

WORDS
Y'ALL         + REGIONALLY APPROPRIATE      75%
YOU GUYS      REGIONALLY INAPPROPRIATE      60%

GREETINGS
HOWDY         + APPROPRIATE                 55%
              (FRIENDLY)

AVATAR GESTURES
REGIONAL SCHOOL SYMBOLS
```

FIGURE 7

| NATIONAL LANGUAGE SUPPORT PROFILE 100 | |
|---|---|
| ENGLISH, U.S. | |
| TEXT TREATMENT | |
| ALL CAPS | - HEATED |
| ALL CAPS + BOLD | - ANGER |
| MULTIPLE ! | STRONG |
| WORDS | |
| IDIOT | - OFFENSIVE |
| INCOMPETENT | STRONG |
| HORRIBLE | STRONG |
| MORONS | - OFFENSIVE |
| ZIT-FACED | - OFFENSIVE |
| PHRASE | |
| END OF MY ROPE | - DESPERATION |
| TEAM OF MONKEYS | - HEATED |

SENDER EMAIL 102

TO: JOHNDOE@ABCCORP.COM
FROM: JERRYSMITH@YYYYINC.COM
RE: NEW CONTRACT DEAL

[deep red color]

John:

I am at the end of my rope on this deal. You are the most incompetent manager I have ever met and your people are horrible. I have been asking for some simple numbers for the past week and no one can seem to find them. What are you morons doing over there? Are you working the team of monkeys too much? In my humble opinion, you are a ZIT-FACED BLUBBERING IDIOT!!!

| INTENDED RESPONSE 104 |
|---|
| HEATED TONE<br>OFFENDED |

FIGURE 10

| IN-BOX MESSAGES 110 | | | |
|---|---|---|---|
| SENDER | TITLE | DATE | RESPONSE |
| TOM LAND | OUT TO LUNCH | 4/5/2004 | FRIENDLY (INTENDED) [LIGHT BLUE] |
| J. SELLERS | PROJECT A | 4/6/2004 | FLAME (ANTICIPATED) [RED] |
| P. TRIP | WEEKEND | 4/7/2004 | LOVING (INTENDED) [PINK] |
| A. BROWN | PROJECT A | 4/8/2004 | INFORMATION (ANTICIPATED) [LIGHT YELLOW] |

INSTANT MESSAGING SYSTEM 114

MOOD SELECTOR 124

SMITH: TIRED
TOM: BORED   126

SEND 116

[DEEP BLUE]
117
How about the baseball game?

OK 118    REACTION RESPONSE ON 120

Smith: What do you want to do this weekend?
[LIGHT BLUE]
            122

FIGURE 12

INDICATING THE CONTEXT OF A COMMUNICATION

CROSS-REFERENCE TO RELATED APPLICATIONS

The present application is related to the following co-pending applications:

(1) U.S. patent application Ser. No. 10/185,296, titled "CONTEXT SEARCHABLE COMMUNICATIONS"; and (2) U.S. patent application Ser. No. 10/185,117, titled "INDICATING THE CONTEXT OF A COMMUNICATION".

BACKGROUND OF THE INVENTION

1. Technical Field

The present invention relates in general to messaging communications and, in particular, to providing a context for content of a messaging communication. Still more particularly, the present invention relates to indicating the context of a communication through a reaction response associated with the content of a communication.

2. Description of the Related Art

As the Internet and telephony expand, the ease of communications between individuals in different locations continues to expand as well. However, with contemporaneous or delayed electronic communications, much of the detectable content available during face-to-face conversation is reduced or eliminated.

During face-to-face conversation, typically more than just word based speech is communicated. "Verbal" and "non-verbal" information combined provide a context for the content of a communication. Verbal information may include, for example, sounds, voice tone, and volume. Non-verbal information may be exchanged, for example, via eye-contact, gestures, facial movements, and body language. For example, the speaker is able to watch the responses of the listener and gauge a responsive emotion to words spoken. In addition, the speaker may be able to watch the listener to receive non-verbal clues as to whether the listener understood the speaker's words. Further, the listener can watch the speaker's movements and tone to better understand the type of emotion that the speaker is trying to convey.

Without the elements of face-to-face communication, verbal and non-verbal information that provide the context for communication content is often lost or eliminated. Without these integral parts of communication, there is a greater chance of misunderstanding in communication. For example, there may be greater misunderstandings due to cultural differences which are not readily apparent when there is not face-to-face communication. Further, there may be misunderstandings as to the emotion with which a communication is made or received that are not quickly corrected without face-to-face, contemporaneous communication.

For example, an electronic mail (e-mail) message provides a valuable type of electronic communication, but not contemporaneous face-to-face communication. A person sending an e-mail message does not have the advantage of watching the recipient's body language in response to reading the electronic mail message to determine whether the recipient understood the communication. In addition, the recipient of an e-mail message may not be fully aware of the age, sex, ethnic background, rank, regional location, or other background information which might influence the way the sender chooses to communicate content. Further, the recipient does not have the benefit of viewing the sender to determine the emotional context in which the sender is writing the e-mail message. The sender might be only disappointed, but use words which the recipient associates with anger, leading to a misinterpretation of what the sender wrote.

Therefore, in view of the foregoing, it would be advantageous to provide a method, system, and program for including the context of an electronic communication within the electronic communication. Further, it would be advantageous to indicate to a sender an anticipated reaction response to the communication by the intended recipient prior to sending the message, such that the sender has an opportunity to adjust the communication or adjust the indicated context of the content of the communication. Moreover, it would be advantageous to indicate to a recipient the intended context of a communication and record the actual reaction response to the communication by the recipient.

SUMMARY OF THE INVENTION

In view of the foregoing, it is therefore an object of the present invention to provide improved messaging communications.

It is another object of the present invention to provide a method, system and program for providing a context for the content of a messaging communication.

It is yet another object of the present invention to provide a method, system and program for indicating the context of a communication through a reaction response associated with the content of a communication.

According to one aspect of the present invention, varying portions of the content of a communication are analyzed to identify a particular reaction response associated with each of the varying portions of content. During a display of the content of the communication, coloring within any of the varying portions indicate the associated reaction responses for the communication to provide a context for the communication.

According to another aspect of the present invention, varying portions of the content of a communication are analyzed to identify an anticipated response by at least one intended recipient. During a display of the content of the communication, colors associated with the anticipated response are indicated in the varying portions of content. The sender may edit the content of the communication to achieve a desired anticipated response.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 depicts an illustrative representation of an individual response profile in accordance with the method, system, and program of the present invention;

FIG. 7 depicts an illustrative representation of a regional response profile in accordance with the method, system, and program of the present invention;

FIG. 9 depicts an illustrative embodiment of a National Language Support profile in accordance with the method, system, and program of the present invention;

FIG. 10 depicts an illustrative representation of a proposed e-mail with an overall reaction response analysis in accordance with the method, system, and program of the present invention;

FIG. 11 depicts an illustrative embodiment of a response categorized in-box in accordance with the method, system, and program of the present invention;

FIG. 12 depicts an illustrative embodiment of an instant messaging session with reaction responses identified in accordance with the method, system, and program of the present invention

DETAILED DESCRIPTION OF THE PREFERRED EMBODIMENT

Figure 1:
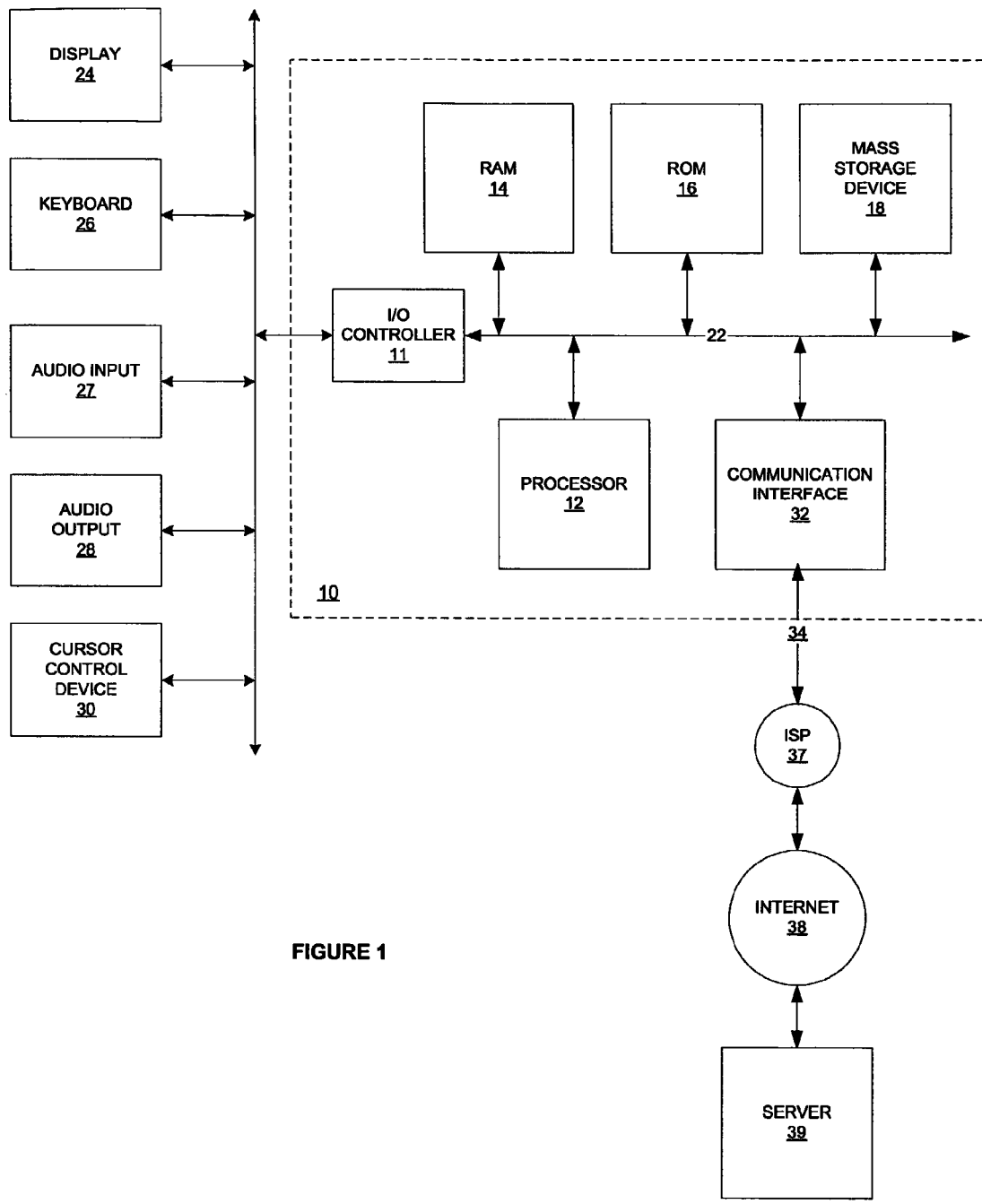
FIG. 1 depicts an embodiment of a computer system with which the method, system, and program of the present invention may be utilized.

A method, system, and program for indicating a reaction response associated with the content of a communication are provided. In a preferred embodiment, the reaction responses are indicated according to color within the communication. However, in alternate embodiments, the reaction responses may also be indicated through other displayable attributes such as text, graphics, icons, images, or sounds, as will be understood by one skilled in the art. Text may be varied in font, font size, font style, subscript, superscript, and other text treatments to indicate reaction responses. In addition, semi-transparent overlays, gradient bars, and other graphical elements may be used to indicate reaction responses.

Communications may include, but are not limited to, documents, electronic communications, voice communications, video communications, graphical communications, and other communications via graphics-based media. Documents may include, but are not limited to, text documents, manuscripts, book texts, software code, and other types of alphanumeric and graphical based files. Electronic communications may include, but are not limited to, electronic mail (e-mail), instant messaging, chat room communications, two-way text messaging, speech-to-text messaging, vibration-to-vibration messaging, and other network-enabled communications. Voice communications may include voice messaging, telephone communications, teleconferencing, and other voice based communication methods. Video communications may include, but are not limited to, video-conferencing, video messaging and other video based communication methods.

In a preferred embodiment of the present invention, communications are transferred between at least one sender to at least one recipient via a network. However, communications may also be transferred via a data storage medium or other platform. Further, communications via a network may be contemporaneous or delayed.

The content of any of the types of communications may include, but are not limited to, text, icons, video images, sound, graphics, avatar gesturing and other types of outputs. According to an advantage of the present invention, a context for the content of a communication is provided by the reaction responses for that content.

Reaction responses may be analyzed for a selected portion of a communication, varying portions of a communication, the whole communication, or multiple communications, for example. Reaction responses may be identified for a selected portion of a communication, varying portions of a communication, the whole communication, or multiple communications.

Reaction responses may include, but are not limited to, the anticipated response of a recipient, the intended response of the sender, and the actual response by the recipient. A sender may be provided with anticipated responses of the recipient for a proposed communication. In addition, the sender may provide intended responses for a proposed communication or an analysis of the content of the communication may render intended responses. The anticipated responses and/or intended responses may be sent with the communication to provide additional context for the recipient. In addition, the recipient may indicate actual responses to a communication. The actual responses may be catalogued and stored and/or returned with the communication to the sender.

The content of the communication and the reaction responses to a communication provide a context for the communication. The context preferably provides the sender and recipient with enhanced understanding of the content intended to be conveyed and the manner in which that content is understood.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

The present invention may be executed in a variety of systems, including a variety of computing systems and electronic devices under a number of different operating systems. In one embodiment of the present invention, the computing system is a portable computing system such as a notebook computer, a palmtop computer, a personal digital assistant, a telephone or other electronic computing system that may also incorporate communications features that provide for telephony, enhanced telephony, messaging and information services. However, the computing system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Referring now to the drawings and in particular to FIG. 1, there is depicted one embodiment of a computer system with which the method, system and program of the present invention may advantageously be utilized. Computer system 10 includes a bus 22 or other communication device for communicating information within computer system 10, and at least one processing device such as processor 12, coupled to bus 22 for processing information. Bus 22 preferably includes low-latency and higher latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowchart of FIG. 14, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of a non-volatile medium is mass storage device 18. Volatile media include dynamic memory such as RAM 14. Transmission media include coaxial cables, copper wire or fiber optics, including the wires that comprise bus 22. Transmission media can also take the form of acoustic or light waves, such as those generated during radio frequency or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

Further, multiple peripheral components may be added to computer system 10, connected to an input/output (I/O) controller 11 coupled to bus 22. For example, an audio input 27 is attached to I/O controller 11 for controlling audio input through a microphone or other sound or lip motion capturing device. An audio output 28 is attached to I/O controller 11 for controlling audio output through a speaker or other audio projection device. A display 24 is also attached to I/O controller 11 for providing visual, tactile or other graphical representation formats. A keyboard 26 and cursor control device 30, such as a mouse, trackball, or cursor direction keys, are coupled to I/O controller 11 as interfaces for user inputs to computer system 10. In alternate embodiments of the present invention, additional input and output peripheral components may be added.

Messaging Systems Context

Figure 2:
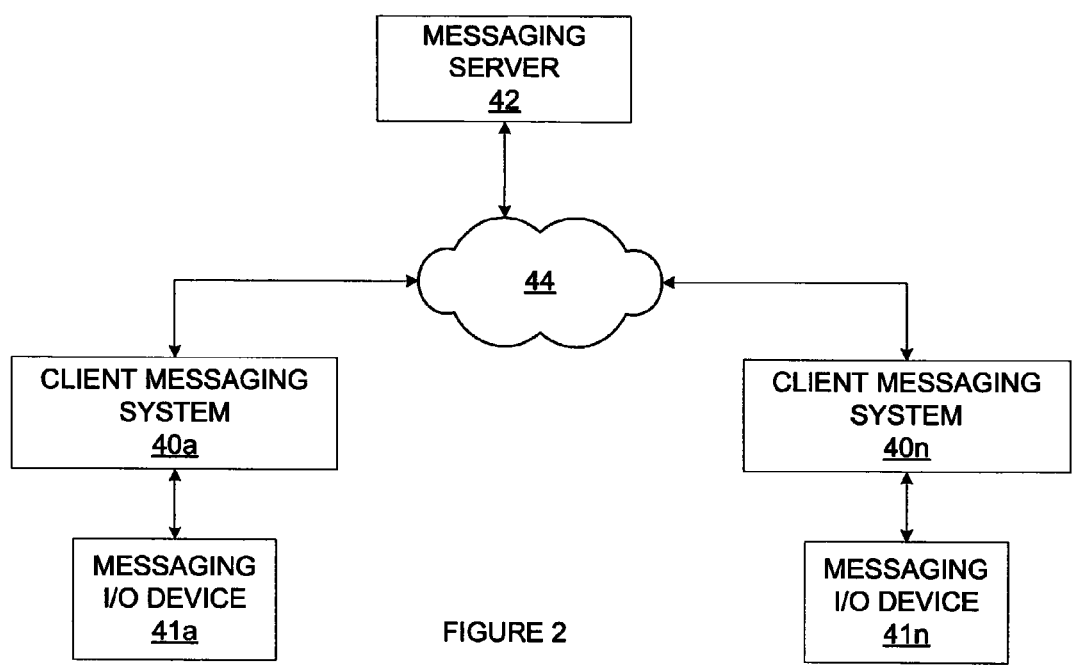
FIG. 2 depicts a simplified block diagram of a client/server environment in which electronic messaging typically takes place in accordance with the method, system and program of the present invention.

With reference now to FIG. 2, there is depicted a simplified block diagram of a client/server environment in which electronic messaging communication typically takes place in accordance with the method, system, and program of the present invention. The client/server environment is implemented within many network architectures. For example, the architecture of the World Wide Web (the Web) follows a traditional client/server model environment.

The terms "client" and "server" are used to refer to a computer's general role as a requester of data (the client) or provider of data (the server). In the Web environment, web browsers such as Netscape Navigator typically reside on client messaging systems 40a-40n and render Web documents (pages) served by at least one messaging server such as messaging server 42. Additionally, each of client messaging systems 40a-40n and messaging server 42 may function as both a "client" and a "server" and may be implemented utilizing a computer system such as computer system 10 of FIG. 1. Further, while the present invention is described with emphasis upon messaging server 42 controlling a messaging session, the present invention may also be performed by client messaging systems 40a-40n engaged in peer-to-peer network communications via a network 44.

The Web may refer to the total set of interlinked hypertext documents residing on servers all around the world. Network 44, such as the Internet, provides an infrastructure for transmitting these hypertext documents between client messaging systems 40a-40n and messaging server 42. Documents (pages) on the Web may be written in multiple languages, such as Hypertext Markup Language (HTML) or Extensible Markup Language (XML), and identified by Uniform Resource Indicators (URIs) that specify the particular messaging server 42 and pathname by which a file can be accessed, and then transmitted from messaging server 42 to an end user utilizing a protocol such as Hypertext Transfer Protocol (HTTP). Web pages may further include text, graphic images, movie files, and sounds, as well as Java applets and other small embedded software programs that execute when the user activates them by clicking on a link. While network 44 is described with reference to the Internet, network 44 may also operate via a WAN or LAN.

A sender enters a message via one of messaging I/O devices 41a-41n for a messaging session at a client messaging system such as client messaging system 40a. The message entry is transmitted to messaging server 42. Messaging server 42 then distributes the message entry to the users participating in the messaging session or to a particular recipient via network 44.

Advantageously, a sender may propose a message to be sent to the other users participating in the messaging session or to a particular recipient. Messaging server 42 analyzes the proposed message to identify an anticipated response associated with the content of the proposed message. The anticipated response is then identified and marked by color in the proposed message which may be viewed with an I/O device. An anticipated response may be indicated for each user participating in the messaging session, for the group of users, or for a particular recipient. The anticipated response may be attached with the message by messaging server 42 when delivered to the recipient client messaging system. Anticipated responses may be determined by messaging server 42 by analyzing the content of the message in view of responses catalogued for the recipient individually, regionally, nationally, and according to other criteria.

The sender may edit the content of the proposed message to achieve a desired anticipated response before sending the message to the recipient. General editing suggestions are provided by messaging server 42. In addition, the sender may specify an intended response to the proposed message and request specific editing suggestions from messaging server 42 that would make the anticipated response for the message the same as or similar to the intended response.

The sender may indicate overall intended responses for a message that are identified in the message by color. For example, the sender may indicate that the sender's mood in writing the message was happy. The color of the background of the message may be tinted yellow to indicate the happy mood.

In addition, the sender may select portions of the message and indicate an intended response to each of the sections. For example, the sender may indicate the greeting is intended to be cordial, the first paragraph is informative, the second paragraph is written with fervor, and the closing is intended to be respectful, where the intended responses are then color coded within the message.

Intended responses may also be determined by messaging server 42 by analyzing the content of the message in view of responses catalogued for the sender individually, regionally, nationally, and according to other criteria. These intended responses may be identified by color within the message and may be combined with other intended responses specifically designated by the sender. In addition, the colorings used to indicate intended responses as determined by messaging server 42 may be distinguished from those intended responses specifically designated by the sender.

When messaging server 42 transfers messages to client messaging systems 40a-40n for output to recipients in the messaging session, the message may include coloring indicating the anticipated responses analyzed by messaging server 42 that may or may not have been provided to the sender and the intended responses of the sender. The recipient may choose whether the I/O device receiving the message will display colorings.

In addition, messaging server 42 may request that the recipient indicate actual responses to a message. The recipient may indicate an overall actual response or actual responses to varying portions of the message. For example, a recipient may indicate an overall mood in which the recipient reads the message, the response that the recipient has to the overall message, and then a reaction to different parts of the message, such as particular icons or wording.

Messaging server 42 may catalog the message for storage with the anticipated responses, intended responses, and actual responses. In addition, messaging server 42 may transmit the actual responses to the message back to the sender, such that the sender may respond to the actual responses.

While in the present embodiment messaging server 42 handles analysis of anticipated responses and tracking of intended and actual responses, in alternate embodiments, reaction response information may be analyzed and indicated by a messaging reaction controller operating on client messaging systems 40a-40n. Further, messaging server 42 may incorporate multiple integrated systems for performing analysis of messages. As will be understood by one skilled in the art, other types of messaging systems may implement the present invention.

In addition, while in the present embodiment, transmission of a communication is described with reference to a contemporaneous or a delayed messaging system platform, in alternate embodiments, other types of platforms may support messaging and other types of communications. For example, communications are transmittable via traditional wireline telephone networks, wireless networks, data storage media, and other platforms for transmission of information.

Figure 3:
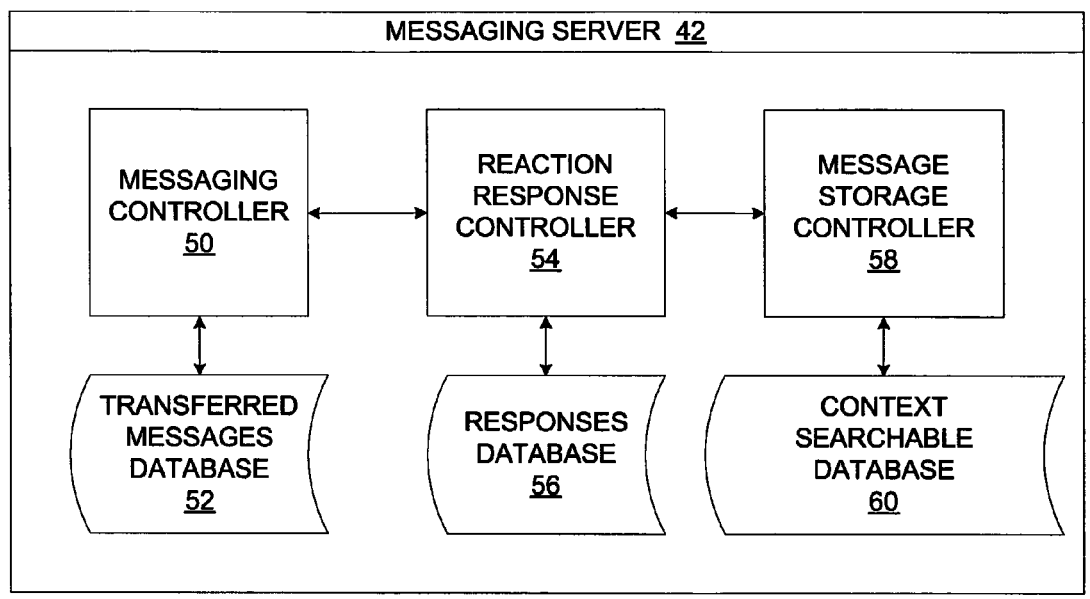
FIG. 3 depicts a block diagram of a messaging system server in accordance with the method, system, and program of the present invention.

Referring now to FIG. 3, there is depicted a block diagram of a messaging system server in accordance with the method, system, and program of the present invention. As illustrated, messaging server 42 includes multiple controllers and databases located within a single server system or within multiple server systems, where the multiple server systems are integrated or accessible via network 44.

A messaging controller 50 preferably controls the distribution of message communications for the messaging system provided by messaging server 42. For purposes of the present invention, messaging controller 50 will be described with respect to message communications such as instant messaging, e-mail messaging or chat room messaging; however messaging controller 50 may control many types of available communications.

Messaging controller 50 distributes message communications from at least one sender to at least one recipient according to the type of messaging selected by the sender. For example, if a sender is participating in a chat room session, then the message communication is sent to other users participating in the channel opened by messaging controller 50 for the chat session. In another example, if a sender is sending an e-mail message, then the message communication is routed to the server that handles e-mail for the identified recipient(s). Senders and recipients are preferably represented by an identifier, such as a screen name, an e-mail address, or other network identifier; however senders and recipients may be anonymous, grouped, or otherwise identified.

Message communications transferred between at least one sender to at least one recipient as controlled by messaging controller 50 are preferably stored in transferred messages database 52 for a specified period of time. For an instant messaging session or a chat room session, all the entries for the session are preferably catalogued together within messages database 52.

A reaction response controller 54 analyzes message communications to determine reaction responses. To analyze reaction responses, reaction response controller 54 preferably accesses a responses database 56 which includes databases of responses catalogued individually, nationally, regionally, and according to other criteria. For output of the communication, coloring or other displayable attributes are added to the content of the communication to indicate reaction responses.

A message storage controller 58 controls storage and access to stored message communications. Preferably, message communications are stored with reaction responses attached in context searchable database 60. In particular, the reaction responses stored in context searchable database 60 are preferably searchable according to sender, recipient, reaction response, and color identifying a reaction response.

Transferred messages database 52, responses database 56, and context searchable database 60 are accessible by messaging server 42 internally, externally, and via a network. In addition, transferred messages database 52, responses database 56, and context searchable database 60 may each be distributed across multiple database storage systems accessible via a network or located within a single data storage system.

Figure 4:
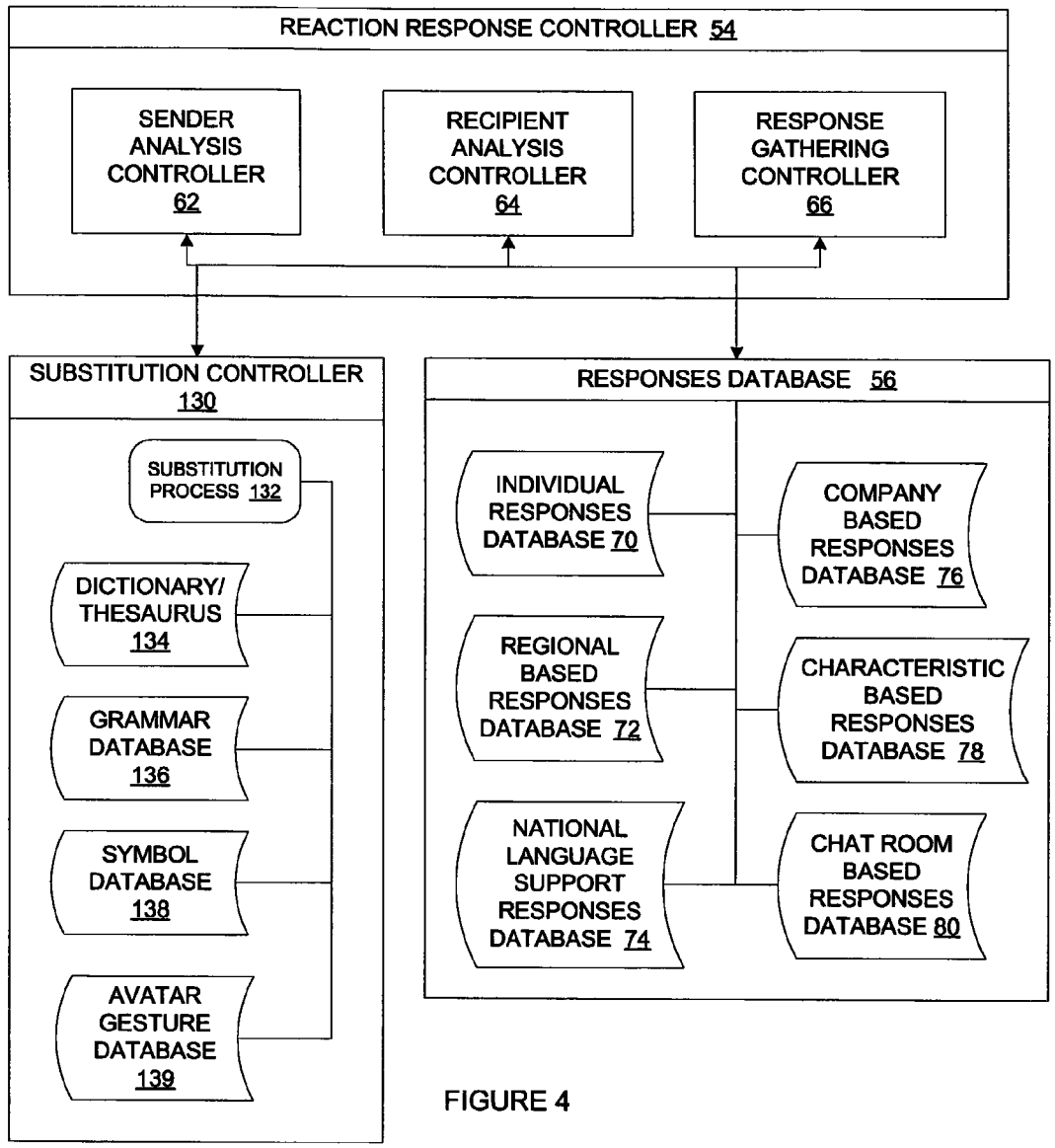
FIG. 4 depicts a block diagram of a reaction response controller and the responses database accessed by the reaction response controller in accordance with the method, system, and program of the present invention.

With reference now to FIG. 4, there is depicted a block diagram of a reaction response controller and the responses database accessed by the reaction response controller in accordance with the method, system, and program of the present invention. As depicted, reaction response controller 54 includes a sender analysis controller 62, a recipient analysis controller 64, and a response gathering controller 66. Each of the controllers may access responses database 56 via a network link or hardwired link.

Sender analysis controller 62 preferably performs reaction response analysis for the sender of a message communication. According to one function, sender analysis controller 62 analyzes a proposed message communication and indicates anticipated responses to the message communication to the sender. According to another function, sender analysis controller 62 recommends adjustments to a proposed message communication. Also, sender analysis controller 62 analyzes the message communication and indicates the sender's intended responses to a message communication. Further, sender analysis controller 62 detects intended responses specifically designated by a sender and attaches all the intended responses to the message communication.

In addition, for sender analysis controller 62 to recommend suggestions for adjustment of a proposed message, sender analysis controller 62 accesses a substitution controller 130. Substitution controller 130 includes a substitution process 132 that determines a range of substitutions for a portion of the content of a proposed message communication. In particular, substitution controller 130 includes, but is not limited to, a dictionary and thesaurus 134 for word adjustment suggestions, a grammar database 136 for grammatical adjustment suggestions, a symbol database 138 for symbol adjustment suggestions, and an avatar gesture database 139 for avatar gesture adjustment suggestions. Substitution controller 130 further accesses responses database 56, as will be further described, to retrieve anticipated and intended responses for different types of content so that suggestions can be tailored according to such reaction responses.

Recipient analysis controller 64 preferably performs reaction response analysis for the recipient of a message communication. According to one function, recipient analysis controller 64 analyzes a received message communication and indicates anticipated responses and intended responses marked within the received message communication. In addition, recipient analysis controller 64 may analyze a received message communication to determine the intended responses of the sender.

According to another function, recipient analysis controller 64 requests the recipient to provide actual responses to the message communication. Actual responses may be selected by the recipient highlighting the message in colors indicating a particular response, by entering words describing a response, and by detection of biometrics, such as a heart rate. Further, recipient analysis controller 64 may control return of the actual responses to the sender, enabling the sender to receive additional communication about how the message communication is understood by the recipient.

In analyzing a message communication to determine reaction responses, sender analysis controller 62 and recipient analysis controller 64 preferably encode the communication to include the reaction responses. The reaction response encoding preferably indicates whether there is an anticipated, intended or actual response, the response description, and a displayable attribute assigned to that response, such as a color. However, the encoding may solely indicate the response description or may solely encode the communications with colors to indicate responses.

In analyzing messages for reaction responses, sender analysis controller 62 accesses responses database 56. Responses database 56 includes multiple databases which may be independent of or integrated into one another. In addition, the multiple databases may be located within a single data storage location or distributed across multiple data storage systems linked by network link or hardwired link.

Identifiers for a sender and a recipient of a communication are included within the communication. From the sender and recipient identifiers, a personal profile may be accessed. Personal profile information may include, but is not limited to, name, regional areas of origin, national language, company association, memberships, and personal characteristics.

The computing systems utilized by the sender and recipient to communicate may store personal profiles that are accessible to reaction response controller 54. A network service provider may store a personal profile for each customer identifier accessible to reaction response controller 54. In addition, a personal identification database accessible via a network may store personal profiles according to identifiers. Layers of security and requirements for access to personal profiles may be provided by each of the computing systems storing personal profiles.

Examples of databases that are components of responses database 56 include, but are not limited to, individual responses database 70, regional based responses database 72, National Language Support (NLS) responses database 74, company based responses database 76, characteristic based responses database 78, and chat room based responses database 80.

Individual responses database 70 stores responses for an individual. Anticipated responses for a particular individual are gathered from actual responses by an individual to previous message communications. In addition, anticipated responses for a particular individual are gathered from pre-recorded responses to sample content by an individual. Further, an individual's schedule may be accessed to anticipate responses based on location, activities, recent sleeping or eating (or lack thereof), and other schedule factors that may aid in anticipating responses to particular types of content.

Intended responses by an individual to a communication are gathered from sender-specified intended responses designated by the sender in previous communications. In addition, intended responses by an individual may be gathered from the pre-recorded responses for a particular individual to sample content.

Regional based responses database 72 stores intended and anticipated responses according to a region associated with the sender or recipient. Regional based responses preferably include region specific responses to words, colloquialisms, phrases, topics, and idioms. For example, the greeting "y'all" will generally not elicit a negative response from a resident of the South. However, a resident of the North may respond negatively to the use of the term. Intended responses are determined from regional based responses database 72 according to the regional area associated with the sender, while anticipated responses are determined from regional based responses database 72 according to the regional area associated with the recipient.

NLS responses database 74 stores responses according to the National Language Support standard. NLS lets applications support multiple languages and cultural conventions. Under NLS, each user selects a profile including a language, country, and cultural information. A typical function of an NLS system is interchanging date and time formats and currency symbols for display according to a user profile.

According to an advantage of the present invention, NLS is further utilized to determine reaction responses by anticipating how content of a communication will be interchanged according to the NLS profile of the recipient. Further, according to an advantage of the present invention, NLS is expanded to provide support for more than just cultural conventions. It is advantageous to also provide for actual language conventions. Therefore, NLS responses database 74 stores responses to language conventions such that where the content of a message is interchanged into another language based format, the language conventions are interchanged with the anticipated and intended meanings.

Company based responses database 76 stores responses according to company or other organization. Companies and organizations often have specific lingo used to refer to products, services, and personnel within the company or organization. In addition, within a corporate culture, there are typically approved topics and word choices while others are viewed negatively. Further, references to a particular project may vary from office to office. Database 76 preferably stores these product and service references and topics so that when employees are communicating with one another or a third party is communicating with an employee, company based anticipated responses and intended responses can be accessed and analyzed.

Characteristic based responses database 78 stores general responses according to personal characteristics. Personal characteristics may include, for example, a profile and preferences. For example, preferences may include music preferences, movie preferences, or food preferences. Each personal characteristic may have general responses associated therewith. General personal characteristic anticipated responses of a recipient may be further specified according to the personal characteristics of the recipient and the sender. Further, general personal characteristic intended responses of a sender may be further specified according to the personal characteristics of the recipient and the sender.

Chat room based responses database 80 stores responses for a particular chat room. Chat rooms are often associated with a particular topic. However, typically the type of conversation in a chat room and what is appropriate in the chat room are determined by those who frequent the chat room. Database 80 preferably stores the anticipated, intended and actual reactions to message communications within a chat room to determine future anticipated and intended responses for chat room communications. Frequent participants in a particular chat room may also set the types of responses that should be anticipated to the use of certain vocabulary, to particular topics, and during particular times of the day.

In addition to accessing responses database 56, reaction response controller 54 requests a record of the reaction responses stored for previous communications between the sender and a particular recipient from message storage controller 58. The previous communication history between a particular sender and a particular recipient is utilized to determine a weighted history value for the present communication. For example, a weighted history value between "0" and "100" may be assigned to the reaction response of each previous communication, where a value of "0" represents an extremely friendly note, a value of "50" represents a neutral note, and a value of "100" represents an extremely hostile note. An average of the previous communication history values is determined and indicated to the sender and recipient. The recipient may assign the value or the value may be determined by reaction response controller 54.

A sender may also access the weighted communication history values for collections of communications between others. For example, if the sender flamed the recipient in a communication to the recipient's boss a week ago, the sender can request the weighted communication history value for communications between the sender and the recipient since the date of the flame mail. A "flame" mail is typically one that indicates that the communication is sent with anger.

The average weighted communication history value for communications received by the recipient from the sender will give the sender further information about the frame of reference in which the recipient will read a future communication from the sender. Further, based on the average weighted communication history value, the sender may adjust a communication in an attempt to adjust the average weighted communication history value between the sender and the recipient. A business may provide incentives for employees to communicate with each other and with customers to achieve communications within a specified range of average weighted communication history values.

Sender analysis controller 62 is preferably accessible for voice-to-text translations which typically translate a dictated voice communication into a text communication. Preferably, in translating the communication from voice into text, sender analysis controller 62 detects body language and tone and encodes these reactions into the text, such that an enhanced reaction response is available.

While sender analysis controller 62 and recipient analysis controller 64 access response database 56 to analyze a current communication with the response criteria, response gathering controller 66 prompts senders and recipients with sample content and requests the senders and recipients to indicate responses to that content. The information gathered by response gathering controller 66 is distributed to responses database 56 for storage in the appropriate individual databases.

Sample content may be presented to a sender or recipient via multiple communication media. For example, response gathering controller 66 may automatically initiate a web page in response to detecting a particular action by a sender or recipient. Further, response gathering controller 66 may initiate an instant messaging session, electronic mail, chat room, text messaging, or other form of communication through which responses to selected content are requested and those responses are returned to response gathering controller 66 for analysis and storage.

An individual responding to sample content may designate preferred levels of privacy for the individual's responses. For example, an individual may designate that the responses are publicly available, semi-public to systems that have passed required criteria, semi-private to only other individuals, organizations, and companies specified by the individual, or privately available only to the individual, organization, or company specifically requesting responses to the sample content. In particular, for semi-public privacy, the network provider may require individuals, organizations, companies, and other network providers to prove that certain security and confidentiality infrastructure is in place to receive access to anticipated responses by individuals.

The sample content used by response gathering controller 66 may include, for example, the content of a proposed communication or the content of an already sent communication. An e-mail option may allow a sender to request that a proposed message be sent to a selection of intended recipients with a request for responses. Response gathering controller 66 utilizes the proposed message as sample content in a request for responses from the selection of intended recipients. The anticipated responses may be shared among the selection of intended recipients and the sender to determine what types of adjustments should be made to the content of the e-mail before transmission to the remaining intended recipients.

In addition, a company may provide sample content utilized by response gathering controller 66 to prompt and retrieve responses from employees, customers, and others, where the sample content is specific to types of content of communications that are typical and appropriate within the company. Responses from the company sample content may be stored in responses database 56 for access only by that company in analyzing communications initiated by employees of the company.

Further, an ISP may design sample content to gain anticipated responses from customers or anyone communicating with a customer through the service. In particular, an ISP may design sample content to determine the types of information that individual users and users in general consider as spam or other undesirable communications. Based on individual and general responses to sample content, the ISP is then better able to filter undesirable communications from reaching customers.

Sample content may be designed for a focus group to anticipate responses to a particular advertising communication before distribution to a wider audience. A focus group may include individuals who have agreed to be a part of the focus group and individuals who by market research are determined to fit the ideal characteristics of the focus group.

Response gathering controller 66 may monitor the travel of an individual and request the individual to update responses to sample content after travel in other regions. For example, when an individual who primarily works and lives in Texas is detected as traveling to New York, response gathering controller 66 may initiate a sample content communication to test whether the individual has changed anticipated and intended responses to certain types of content after exposure to the use of that content in another region. As will be understood by one skilled in the art, other types of sample content may be designed and distributed.

Figure 5:
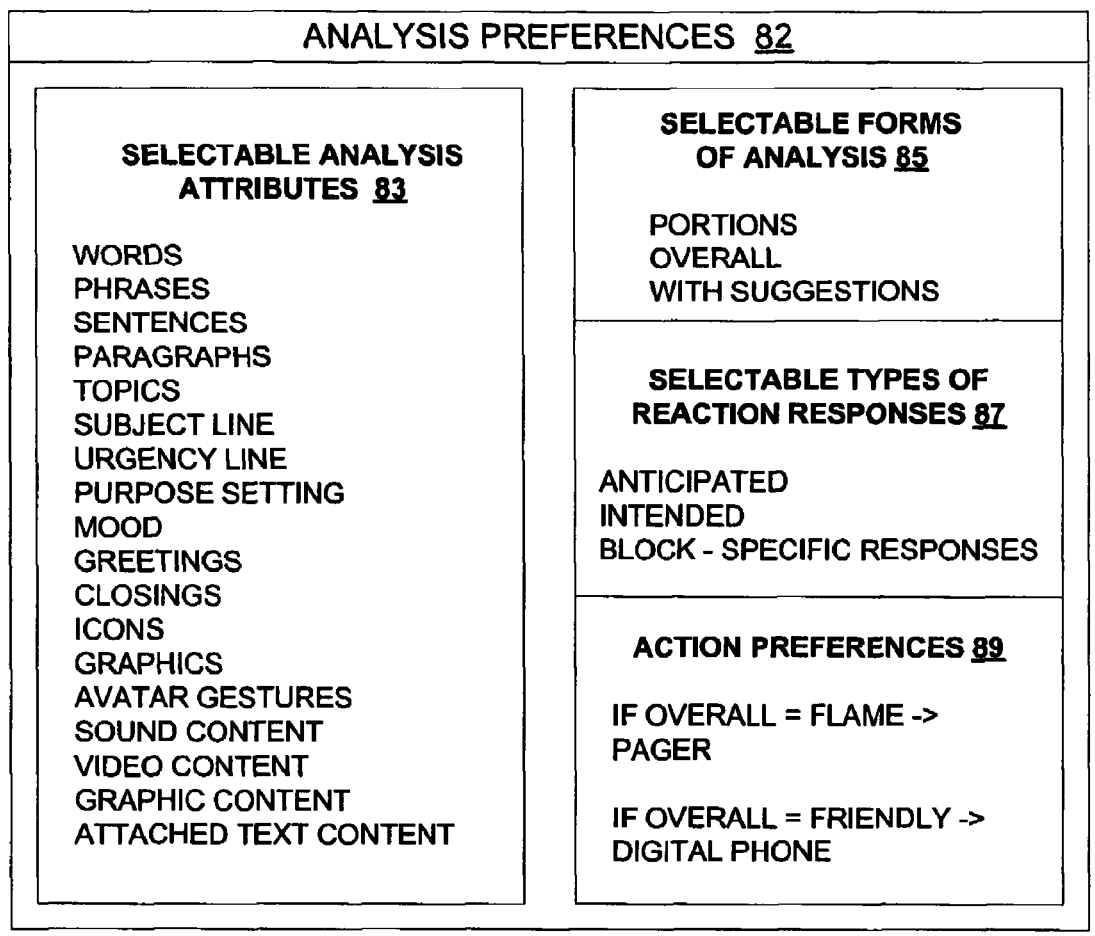
FIG. 5 depicts an illustrative representation of categories of analysis of communications in accordance with the method, system, and program of the present invention.

Referring now to FIG. 5, there is depicted an illustrative representation of selectable categories of analysis of communications in accordance with the method, system, and program of the present invention. Analysis preferences window 82 depicts examples of the types of content 83 that may be analyzed within a communication. Preferably, a sender or recipient may specify the types of response analysis of a message by selecting from among types of content 83.

First, the words within a communication may be compared with the anticipated responses to particular words specified in an individual responses database. In particular, where a communication is translated by a translation application, the translation application will compare anticipated responses to particular words with the sender's intended response to particular words in choosing how to translate those words.

In addition, it is advantageous to analyze the phrases of a communication. In particular, idioms within a single language may change rapidly by region such that speakers of a language in one region may not understand the meaning of an idiom spoken in another region or may have a different response than was intended to that idiom.

Analysis of entire sentences and paragraphs is advantageous. For example, a sender may indicate an overall intended response to an entire sentence or paragraph, rather than singling out individual words. Further, an analysis controller may determine the overall tone of a sentence or paragraph dependent upon the types of words and phrases within the sentences and paragraphs.

With each type of communication, there are unique characteristics of that communication that provide additional content for the communication. For example, in an e-mail, there is a subject line to be filled in by the sender. Often, recipients use the subject line to determine the order in which to open e-mails. Also, recipients may identify some types of subject lines as indicative of undesirable mail and automatically remove such e-mail from view. Advantageously, the subject line of a proposed e-mail may be analyzed to determine the anticipated response to such a subject line.

E-mail often has an additional attribute of an urgency setting. A sender may indicate whether a message is of regular importance or urgent or extremely urgent. Further, in the present invention, for an e-mail that needs to be read or responded to by a deadline, a user may indicate the timeliness urgency for an e-mail. When the e-mail shows up in the recipient's e-mail box, these urgency settings may be provided if supported. This setting enhances the content of an e-mail. However, what is extremely urgent to one person may only be of limited urgency to another, thus causing miscommunication or frustration. Further, it may be the habit of some senders to designate every e-mail as urgent, reducing the effectiveness of such as selection where a recipient realizes over time that e-mails from a particular sender will always be urgent.

In the present invention, communications are enhanced by providing purpose settings for any type of communication, in addition to the urgency settings that may be available in particular types of communications. A purpose setting allows a sender to indicate whether a communication is, for example, business, personal, or other type of purpose.

Further, the sender can indicate the general emotion or mood with which a communication is sent by analyzing the content of the communication or based on a sender selection. The framework under which an intended recipient will understand the purpose settings may be anticipated by analysis. A current mood for an intended recipient may be accessed from a mood designated by that intended recipient in the current communication or in another communication session.

A specific area of words and phrases analyzed may include greetings and closings. A proposed communication by an employee to a high-level executive may be analyzed, for example, to determine whether the greeting and closing of the proposed communication are sufficiently formal for that particular high-level executive. When a communication is received and the recipient selects for the communication to be translated, the greetings and closings are preferably translated according to the intended response of the sender to those greetings. For example, the sender may intend for the greeting and closing to be business respectful.

Additional content may be provided to a communication through graphics, sound, and video. Icons, such as emoticons, are often used in communications to indicate an emotion associated with a sentence. For example, a sentence that is a joke may be followed by a smiley face emoticon that would indicate to some readers that the sentence is a joke. However, the response of different recipients to different emoticons and other icons may vary widely by region, nation, expertise with Internet based communication, age, and other factors. A winking emoticon may be understood by one recipient as flirtatious and another recipient as joking.

Some types of communication provide graphical or video based avatars that represent participants in that communication. Typically, avatars are displayed in more instantaneous types of communications, such as instant messaging and chat rooms, but are not limited to those types of communications. Avatars typically make gestures, speak the text provided by each participant, and move around the display area during communication. Participants may select gestures that they would like avatars to make or the avatars may automatically make certain gestures from a selection of available gestures. Advantageously, a participant may select an intended emotion for the avatar to gesture. Further, in the present invention, the anticipated responses of certain participants to certain gestures may be determined and provided to the other participants, such that communications are enhanced.

Sound, video and graphic content provided in a communication are analyzed to determine responses. Sound content may include a voice mail, sound clip or other audio attachment. Anticipated and intended responses to sound content are performed by, for example, adjusting the tone of the sound, the volume of the sound, or other attributes of the sound to enhance meaning. Analysis of sound content may be performed by translating the sound content attachment into text and then analyzing the text. Further, video and graphic content may be translated and analyzed similarly. Video may also be analyzed by analyzing a rating associated with the video and by analyzing types of images within the video.

An advantageous function of electronic communications includes the function of attaching documents to a communication. For example, a sender may attach a text, sound, graphic, or video file with an e-mail message. Advantageously, the content of the attachment is analyzed by translating the attachment into a text equivalent if needed.

In addition, analysis preferences window 82 illustrates the forms 85 in which analysis may be output to the sender or recipient. For example, the sender or recipient may request to view the reaction responses by color for each portion of the content analyzed, the overall reaction response by color for the message, and the reaction responses with suggestions for adjustment. In addition, the sender or recipient may request to view the weighted communication history value for previous communications between the sender and the recipient or other collections of previous communications.

In determining an overall reaction response for a communication, a weighted history value for the current communication may be determined. In particular, each word, sentence, paragraph, page, chapter or other portion of the message is weighted by the previous words, sentences, paragraphs, pages, chapters and other portions of the message to determine whether the context of the current portions are changed by the content of the previous portions. For example, if the opening paragraph of a communication is hostile, the reaction response value assigned to the opening paragraph may weight the reaction responses determined for other paragraphs in view of the hostility of the opening paragraph, whereas by themselves the other paragraphs thereafter would not be read as hostile.

Further, analysis preferences window 82 illustrates the types of reaction response settings 87 that may be selected for output with a communication. A sender and a recipient may each specify which of the types of reaction response settings 87 to be output for a communication. For example, the sender may request output of anticipated responses, output of intended responses, and blocking of specific responses within the proposed message, but not others. In blocking specific responses, the recipient may request display of anticipated responses only. In addition, for example, a sender may specify that all reaction responses to icons within a communication are blocked from display.

Analysis preferences window 82 also depicts action preferences settings 89. A sender may indicate a preference for which output device connected to a recipient computer receives the communication according to the reaction response associated with the communication. In addition, a recipient may specify filtering for communications received based on the overall reaction response for the content. For example, a recipient may specify transfer of all "flame" communications to a pager and all friendly communications in text to a digital phone.

With reference now to FIG. 6, there is depicted an illustrative representation of an individual response profile in accordance with the method, system, and program of the present invention. As depicted, an individual response profile 84 is an example of responses stored for an individual within individual responses database 70.

Responses stored within individual response profile 84 may be gathered from actual responses and intended responses to communications. In addition, responses stored within individual response profile 84 may be gathered from an individual's responses to sample content.

In the example of individual response profile 84, an individual's responses to particular words, phrases, greetings, and topics are indicated. In alternate embodiments, responses to content within other categories of content may be indicated.

Misunderstandings in communication often arise when the content of a communication means one thing to one person and another thing to another. For example, this individual will respond to the phrase "kick the bucket" is in an offended manner, however another individual's profile may indicate that individual considers that phrase humorous.

The responses displayed indicate a feeling associated with a type of content. In addition, positive (+) and negative (−) signs further describe the intensity of the feeling. For example, in addition to finding a lack of greeting offensive, the individual has indicated a double negative to indicate the intensity of offensiveness. In another example, the individual has indicated a triple positive, indicating a strong interest, in any communication with the topic of baseball. In addition to the types of response indicators depicted, other types of response indicators may be utilized. For example, thumbs up/thumbs down response indicators might be utilized.

In the example, the responses are assumed to apply to how an individual would respond as well as how the individual would intend for another to respond if the individual used the words in a communication. However, in alternate embodiments, an individual may specify that the individual would respond in one manner to receiving a communication with particular comment (the anticipated response), but would intend a different response if the same content was sent by the individual (the intended response).

Referring now to FIG. 7, there is depicted an illustrative representation of a regional response profile in accordance with the method, system, and program of the present invention. As illustrated, a regional response profile 86 is an example of responses stored for a region within regional based responses database 72 for the regional area of Texas.

Responses stored within regional response profile 86 may be gathered from actual responses and intended responses to communications associated with the region. In particular, a broad range of communications may be analyzed to statistically determine general responses for a region. Further, the responses of individuals in a particular region to sample content may be analyzed to statistically determine general responses for a region. As illustrated, the statistical determinations are provided with each of the general responses.

Regions may be defined, for example, by specific geographical borders, city boundaries, county boundaries, state boundaries, country boundaries or continental boundaries. In addition, regions may be defined according to a characteristic, such as a "high-tech" region of all the individuals working in the high technology industry within a larger boundary, such as a state boundary.

Analyzing a communication in view of regional responses allows senders and recipients in differing regions to better communicate. For example, for the region depicted, the use of "howdy" as a greeting is appropriate and is connoted as a friendly greeting. If the sender is from the region depicted and the recipient is not, the recipient would receive a communication showing the intended response to the greeting as a friendly greeting.

Individuals within a region may differ with the general responses for that region. For example, the word "y'all" will generally not elicit a negative response from a resident of the South and therefore is generally regionally appropriate. However, a resident of the North may respond negatively to the use of the term.

Gestures are often given regionally-based meanings or exformation (shared knowledge between parties as to a meaning of a gesture that is lost on those who do not know the gesture has meaning). For example, most universities have a school cheer and a gesture associated with the cheer. Knowledge of university based gestures is typically regional, where universities who compete against one another know one another's gestures. Preferably, regional responses to these university based gestures are specified to add meaning to such gestures when performed by an avatar.

Figure 8:
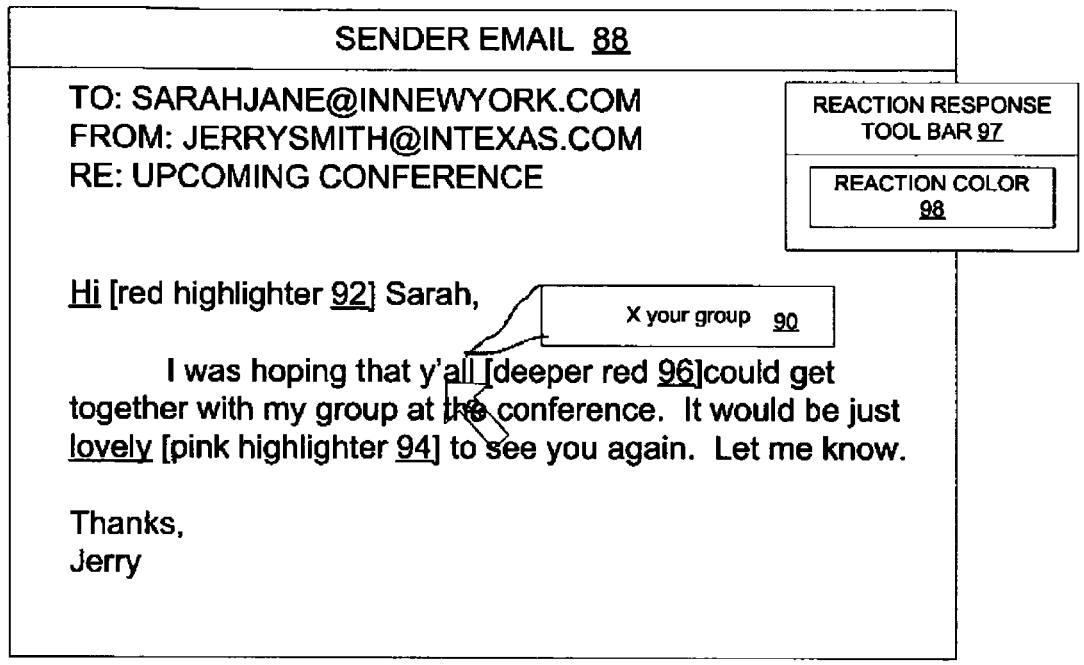
FIG. 8 depicts an illustrative representation of a proposed e-mail in accordance with the method, system, and program of the present invention.

With reference now to FIG. 8, there is depicted an illustrative representation of a proposed e-mail in accordance with the method, system, and program of the present invention. As depicted, a sender e-mail 88 includes an example of a proposed communication by the sender. Proposed e-mail communications include the message the sender proposes to send to a particular recipient or recipients.

For purposes of the example, individual response profile 84 in FIG. 6 represents the individual response profile for the intended recipient and regional response profile 86 in FIG. 7 represents the regional response profile for the sender. In addition, for purposes of the example, varying portions of the proposed e-mail are analyzed for anticipated responses, rather than an analysis of the overall anticipated response. However, in alternate embodiments, an overall anticipated response to the e-mail may be analyzed or other varying portions of the e-mail may be analyzed for anticipated responses.

In the example, the proposed greeting for the message is "Hi Sarah." As indicated at reference numeral 92, the "Hi" portion of the greeting is highlighted in red. The color red, for purposes of example, represents the anticipation that the recipient will be offended by the greeting.

Preferably, different shades of red may be utilized to distinguish the intensities of offensiveness. For example, as indicated at reference numeral 96, the word "y'all" is highlighted in a deeper red in anticipation that the recipient will be more offended by these words than by the greeting. The level of offensiveness to the word "y'all" is indicated in individual response profile 84.

Different colors preferably represent different types of responses. For example, the anticipated response of affection is represented by a pink highlighting. In sender email 88, the anticipated response of the recipient to the word "lovely" is with affection and therefore is highlighted in pink. Each sender or recipient may specify the colors that represent different responses or a standard color selection may be fixed for each type of response.

Where an anticipated response to the proposed e-mail is not the desired response by the sender, the sender may request suggestions for changing the proposed e-mail. The sender analysis controller preferably determines changes that would produce positive, negative, or neutral results.

According to the present embodiment, the sender may request suggestions by positioning a cursor 95 over the portions of the proposed e-mail for which the sender would like suggestions. In the example, in response to the position of cursor 95, a pop-up window 90 displays suggestions for adjusting the proposed e-mail and the anticipated response to each suggestion.

The suggestions are based on the individual responses of the recipient and the regional responses of the sender, in addition to other grammatical suggestions. For example, the use of "y'all", while regionally appropriate for the sender, is considered an uneducated word by the intended recipient. However, the recommendation of "your group" is a neutral grammatical change suggestion, as indicated by the "X". A neutral grammatical change suggestions is a suggested change that does not carry a positive or negative reaction response.

In addition, the sender may indicate intended responses to the proposed e-mail. The sender's intended responses are preferably marked in the e-mail displayed to the recipient. In addition, by marking intended responses, the sender may then request that the suggestions with anticipated responses which most closely match the intended responses be displayed. For example, where the sender wants to send a message that is more serious, the sender may indicate the intention for the message to be serious and request an amended version of the communication that is anticipated to be taken seriously by the intended recipient.

To indicate intended response to the proposed e-mail, the sender may deselect color highlighted areas and add other highlighted color areas in a color that represents the response intended. In particular, tool bar 97 includes a selectable tool 98 for reaction response highlighting. The sender selects the tool and a highlighting color. Advantageously, the colors are listed with associated types of reaction responses. Where a sender utilizes selectable tool 98, the highlighting indicates a particular intended response. Where a recipient utilizes selectable tool 98, the highlighting indicates a particular actual response.

In the example depicted, the sender may highlight the word "lovely" indicated at reference numeral 94 with a light blue color to indicate friendship. By highlighting the word "lovely" in a color different from the color representing the anticipated response, the sender is applying the sender's intended meaning to the word. In the display of the e-mail to the recipient, the word "lovely" will be highlighted in light blue, such that the sender is enabled to dissipate any miscommunication about how the word should be interpreted. The sender also has the option of requesting an edit of the e-mail, where a word that better represents the sender's intent is suggested.

Referring now to FIG. 9, there is depicted an illustrative embodiment of a National Language Support profile in accordance with the method, system, and program of the present invention. As illustrated, a National Language Support profile 100 includes examples of responses stored based on a particular national language. National Language Support enables applications to support multiple languages and cultural conventions. Under NLS, each user selects a profile including a language, country, and cultural information. A typical function of an NLS system is interchanging date and time formats and currency symbols for display according to a user profile.

According to an advantage of the present invention, NLS is utilized to determine reaction responses by anticipating how content of a communication will be interchanged according to the NLS profile of the recipient. Further, according to an advantage of the present invention, NLS is expanded to provide support for more than just cultural conventions. It is advantageous to also provide for actual language conventions.

For example, National Language Support profile 100 provides an example of responses stored for a profile matching English as the language and the United States as the country. First, responses to types of text treatment are provided. Traditional NLS provides for interchanging fonts used depending on the user profile. However, the treatment of a font can provide additional communication. For the example profile, where words are in all-caps those words are typically received as a heated communication. Where words are in all-caps and bold, the words are typically received as a communication sent in anger. Further, use of multiple exclamation points typically implies a strong feeling associated with the words communicated.

If the communication is interchanged into another language, preferably the responses associated with the text treatment are interchanged as well. For example, if there is a text treatment in the recipient's language that indicates a strong feeling associated with the words communicated, that text character or other symbol is interchanged. However, coloring language to indicate responses, where that coloring is interchangeable, is another way to indicate text treatment. Further, if the communication is received by another person with the same national profile, it is still advantageous to indicate an intended or anticipated response through coloring to enhance communication.

Not all users with the same national language profile understand the subtleties of the meanings associated with different characters, text treatments, avatar gestures, and graphics. For example, not all users of National Language Support profile 100 understand that when a sentence is typed in all caps, that text treatment is deemed to be a heated or "flame" communication. In addition, as Internet communication conventions change, it would be advantageous to provide a National Language Support basis for generalizing the responses to different conventions.

National Language Support profile 100 also includes responses to content within other categories of analysis for the specific language and country profile. In general, within a particular language and region certain words and phrases have typical associated responses. For example, certain words by definition have a derogatory meaning, such as idiot, moron, and zit-faced. Other words, by definition are typically utilized in a strong tone, such as incompetent and horrible. Further, some languages include idioms that have associated general responses.

With reference now to FIG. 10, there is depicted an illustrative representation of a proposed e-mail with an overall reaction response analysis in accordance with the method, system, and program of the present invention. As depicted, sender e-mail 102 includes a proposed message from a sender to an intended recipient.

For purposes of the example, the content of the proposed message is analyzed in view of a sender with a profile matching National Language Support profile 100 in FIG. 9. In analyzing the proposed e-mail in view of National Language Support profile 100, the text treatment, words, and phrases utilized in the proposed e-mail indicate that when used, these types of content are intended with in a heated and offending manner.

In the example, the window utilized for sender e-mail 102 is colored a deep red color to represent the intended response of the proposed e-mail. Where the displayed window or other graphical area containing a communication is shaded, the shading color can indicate an anticipated response, an intended response or both.

In addition, a pop-up window 104 specifically designates the meaning of the deep red color. In particular, the overall intended response is conveying a message in a heated tone and offending manner. While not depicted, the specific text treatment, words, and phrases analyzed to determine the overall intended response may also be listed within pop-up window 104 or colored specifically within the text content of sender e-mail 102. In addition, while a pop-up window is the graphical element utilized for displaying overall intended responses in the example, in alternate examples, other types of outputs may be utilized to indicate the overall intended responses associated with a particular coloring attribute indicated within a message.

Referring now to FIG. 11, there is depicted an illustrative embodiment of a response categorized in-box in accordance with the method, system, and program of the present invention. As depicted, in-box messages window 110 lists multiple message entries 112 received by a particular recipient.

Each of selectable message entries 112 indicates the sender, the title of the message, the date and time stamp, and a reaction response. The reaction response may indicate an intended response by the sender, an anticipated response by the recipient, or both. By selecting any of selectable message entries 112, the message associated with the entry is displayed or played.

In the examples, messages intended as friendly and loving are depicted. In addition, a message anticipated as a flame message and an information based message are illustrated. In alternate embodiments, alternate types of responses may be specified.

As depicted, the reaction response described with each message is the overall intended or anticipated response associated with each message. However, in alternate embodiments, the intended and anticipated responses associated with varying portions of each message may be displayed.

Each reaction response is further highlighted by a color representing the reaction response. For example, a light blue color is associated with friendly messages as opposed to a red color associated with "flaming" or anger. A pink color is associated with a loving message, while a light yellow color is associated with an informational message. In an alternate embodiment, rather than specifically listing a reaction response associated with each message entry, each message entry may be highlighted with the color associated with the associated reaction response.

As an advantage of the present invention, a recipient may sort message entries by reaction response. For example, a recipient may request to list all received message entries in groups by the reaction response associated with each, rather than by date/time or other sorting criteria. Thus, all the love messages will be listed together. In addition, a user may select to automatically throw away messages with particular reaction responses or place messages with particular reaction responses in a special folder.

With reference now to FIG. 12, there is depicted an illustrative embodiment of an instant messaging session with reaction responses identified in accordance with the method, system, and program of the present invention. As illustrated, an instant messaging session window 114 includes message entry area 116 for entry of a proposed message and message session area 122 for display of all entries during the message session.

In the example, a proposed message 117 is highlighted in a deep blue color. The coloring of proposed message 117 indicates the intended recipient's strong liking of any baseball topic.

The sender has the option of selecting to turn the reaction response controller on and off by selection of selectable button 120. When the reaction response controller is on, the sender's proposed message is analyzed to determine anticipated and intended responses. The sender may make adjustments to the proposed message before selecting to add the message as an entry to the messaging session by selection of selectable button 118.

Message session area 122 preferably displays the message entries for a messaging session in the order the entries are sent. The coloring indicating reaction responses may be included in the message entries displayed. For example, the first entry for the session is highlighted light blue to indicate a friendly message.

In addition, each participant in a message session may indicate a current mood. In particular, mood selector 124 allows a participant in the instant messaging session to select from among multiple moods that are added to a list 126 of the current moods for an instant messaging session. In the example, Smith, the recipient, has indicated a mood of tired while the sender, Tom has indicated a mood of bored. Participants may change a current mood setting during a messaging session. Further, the mood of each participant is taken into account in analyzing and determining reaction responses.

Preferably, the user may indicate a current mood that is specified in any communication in which the user participates. For example, the mood indicated by the sender in instant messaging session window 114 is automatically updated in a subsequent chat session the sender jumps into. Where there are multiple users participating in a communication, such as a chat session, a symbol or color may be applied to a user's name to indicate the user's mood for each entry made by the user during the communication.

Figure 13:
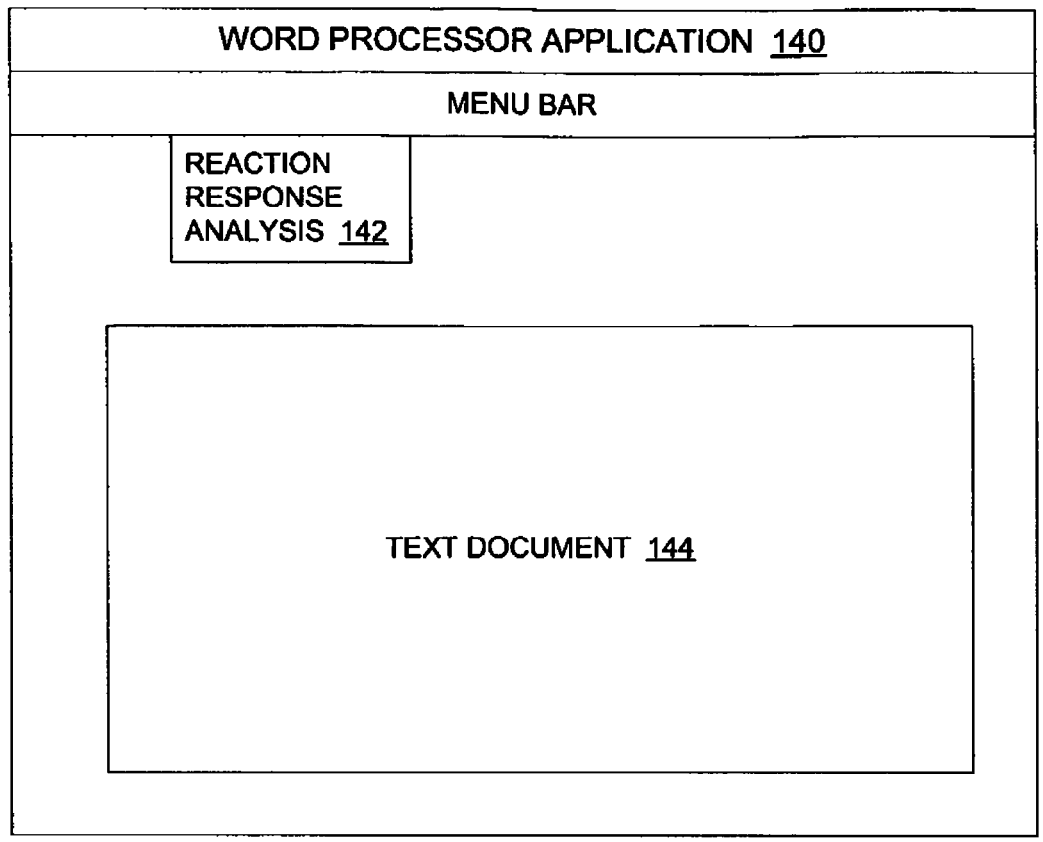
FIG. 13 depicts an illustrative embodiment of a word processor with reaction response analysis functions in accordance with the method, system, and program of the present invention.

Referring now to FIG. 13, there is depicted an illustrative embodiment of a word processor with reaction response analysis functions in accordance with the method, system, and program of the present invention. As depicted, a word processor application window 140 displays a text document 144. Advantageously, the word processing application includes a reaction response analysis function for analyzing and designating the reaction responses for a text document. Preferably, the user may select the reaction response analysis by multiple types of input, such as by a key entry or selection from a menu list 142.

Text document 144 may be analyzed for reaction responses in view of a particular recipient or recipients who will receive text document 144. In addition, text document 144 may be analyzed for reaction responses in view of a particular business context in which the text document will be received. Further, other bases for analysis may be selected.

To perform the analysis, the word processing application may access a reaction response controller via a network. Alternatively, the word processing application may include a local reaction response controller.

Coloring is added to text document 144 to represent the reaction responses anticipated or intended for each sender and recipient. In addition, suggestions may be made for adjusting text document 144. Further, where a text document is updated by multiple users, reaction responses may be updated with each revision of text document 144. A particular text treatment may be added to distinguish reaction responses associated with each user.

The reaction responses determined for text document 144 and associated coloring may be saved with text document 144, such that when text document 144 is subsequently opened, the coloring representing reaction responses is displayed. Further, a user may select to turn the reaction response coloring off and on within a text document.

Figure 14:
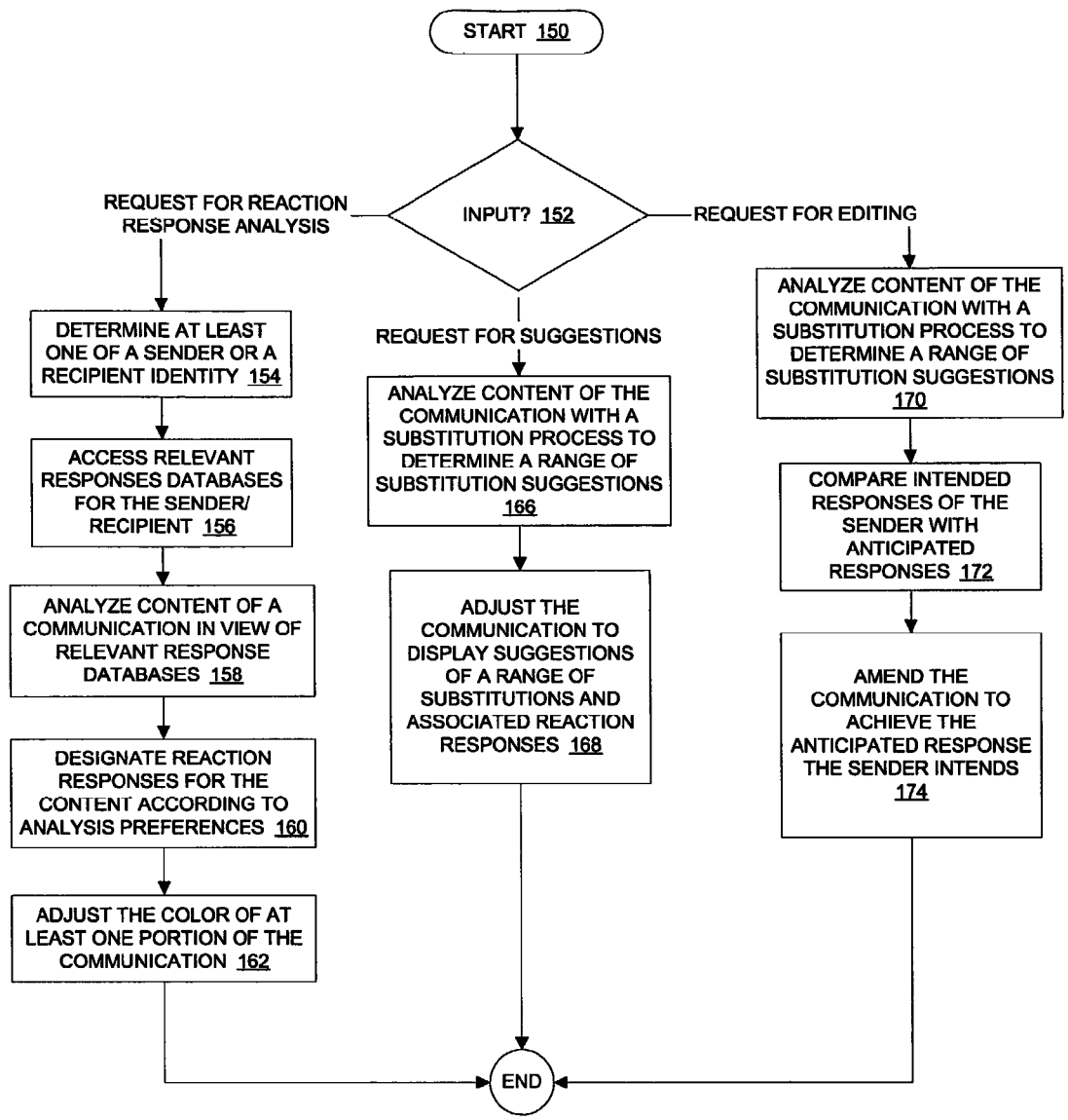
FIG. 14 depicts a high level logic flowchart of a process and program for reaction response analysis.

With reference now to FIG. 14, there is depicted a high level logic flowchart of a process and program for reaction response analysis. As depicted, the process starts at block 150 and thereafter proceeds to block 152. The process steps may be performed by a server or other computing systems enabled to perform analysis of reaction responses.

Block 152 illustrates a determination as to whether an input is received. If a request for reaction response analysis is received, the process passes to block 154. If a request for suggestions is received, the process passes to block 166. If a request for editing a communication to achieve an intended response is received, then the process passes to block 170.

First, a request for reaction response analysis may be initiated by a sender, a recipient, or a process that automatically performs reaction response analysis. In providing a reaction response analysis, block 154 depicts determining at least one of a sender or a recipient identity. In determining an identity, a screen name, identification number, or other identifier may be accessed. Preferably a profile associated with the identity is also accessible. A profile may include personal information and characteristics about the sender or recipient. Both the sender and recipient may be identified, such that the reaction response analysis may yield both anticipated responses of the recipient and intended responses of the sender.

Next, block 156 illustrates accessing relevant responses databases according to the sender and/or recipient identity. The relevant responses databases may include reaction responses stored individually based, regionally based, National Language Support based, characteristic based, business based and according to other categories of basis.

Thereafter, block 158 depicts analyzing the content of the communication in view of the reaction responses from the relevant response databases. In particular, analysis may include comparing words, phrases, sentences, symbols, graphics, sounds, and other content of the communication with the databases having indications of intended and anticipated responses to varying types of content. Further, in particular, a sender or recipient may designate preferences for the types of analysis to be performed within a communication. For example, a sender may request for words, phrases and sentences to be analyzed, but not request for symbols and text attachments to be analyzed.

Next, block 160 illustrates designating the reaction responses for the content according to analysis preferences. Within the content of a communication, tags, markers or other command indicators may be added or notated that specify the reaction response associated with each of the portions of the content requested for analysis by the sender or recipient. For example, a message in extensible mark-up language (XML) format may be broken into nodes where nodes with analyzed content are specified by attributes intended to show reaction responses.

Thereafter, block 162 depicts adjusting the color of at least one portion of the communication, and the process ends. Advantageously the requester specifies preferences for whether coloring for each reaction response should be displayed, coloring for the overall reaction response should be displayed, or coloring for specified types of reaction responses should be displayed. Where a requester specifies a request for the overall reaction response, the coloring may be adjusted for the window or other display interface in which the communication is displayed. In particular, if no reaction response is determined for a communication, no coloring may be added, however another type of graphical indicator may indicate that no reaction response is determined.

In particular, the color of the communication may be adjusted by the messaging server or may be adjusted at the computing system utilized by the sender or recipient. A messaging server specifies colors associated with each type of reaction response, and adjusts the coloring of communications according to these specified colors. At the sender or recipient computing system, the sender or recipient may individually specify which colors to associate with each reaction response. A sender may further specify colors of portions of a communication that are to be displayed in the communication to the recipient A request for suggestions is typically initiated by a sender of a proposed communication concurrently with a request for reaction response analysis. Block 166 illustrates analyzing the content of the communication with a substitution process to determine a range of substitution suggestions. The substitution process includes accessing a dictionary, thesaurus, grammar database, and other databases available for comparing the meaning of content and finding other content with similar meaning as a substitute. In particular, the substitution process also utilizes the relevant responses databases for the sender and recipient to provide anticipated and intended responses to substitute suggestions.

Next, block 168 depicts adjusting the communication to display the suggestions of the range of substitutions and any associated reaction responses, and the process ends. In particular, in adjusting the communication for display of the range of substitutions, pop-up windows may be provided that are initiated by the user positioning a cursor over particular content. Alternatively, the range of suggestions may be displayed as selectable options within the communication. A sender may selectively choose from the range of substitutions to replace current content. In response to a selection from the sender, the selected substitution replaces the current content and the coloring of the content is updated to indicate the new context.

A request for editing is typically initiated by a sender of a proposed communication in an attempt to adjust a communication to match the anticipated responses to a desired intended response specified by the sender. The communication has already been analyzed to determine anticipated reaction responses by an intended recipient. Then, block 170 depicts analyzing the content of the communication with a substitution process to determine a range of substitution suggestions, as described with block 166. Next, block 172 illustrates comparing the sender's intended responses with the anticipated responses and range of substitution suggestions. Thereafter, block 174 depicts amending the communication to achieve the anticipated response the sender intends, and the process ends. In particular, the range of substitution suggestions is filtered to select the suggestions that are most likely to achieve a recipient anticipated response that matches the sender intended response.

Automatic editing of a communication is particularly advantageous where an advertiser desires to create advertising material with a particular intended response by a particular marketing segment. The intended recipient is then a marketing segment that may be specified by personal characteristics, region, national language, business associations, or other categories specified within the responses database. For example, if the intended recipient is a marketing segment of the Midwest U.S., the proposed advertising material will be analyzed utilizing responses stored in the Midwest regional based responses database. The proposed advertising material will then automatically be amended to achieve the intended response.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular types of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for distributing a communication based on reaction response, comprising:

delivering, using at least one messaging server that provides electronic communication service over a network to at least one particular recipient, a plurality of electronic messages from a plurality of separate senders to said at least one particular recipient;

receiving, at said at least one messaging server, at least one actual response specified by said at least one particular recipient to at least one separate type of content for each of said plurality of electronic messages by detecting a separate graphical display attribute selected by said at least one particular recipient to associate with each said at least one separate type of content within a display of each of said plurality of electronic messages, wherein each said separate graphical attribute represents at least one separate type of response from among a plurality of types of responses;

storing, in a database, by said at least one messaging server, said at least one actual response to said at least one separate type of content specified by said at least one particular recipient through each said separate graphical display attribute;

selecting, by said at least one messaging server, a particular communication output interface from among a plurality of separate output interfaces each specified by at least one of said plurality of senders for receiving communications identified with said at least one separate type of response from among said plurality of types of responses, wherein said particular communication output interface is specified by said at least one of said plurality of senders for receipt of communications with said separate type of response of said at least one actual response;

enabling said at least one messaging server to detect a proposed communication request from said at least one of said plurality of senders to said at least one particular recipient; and returning, by said at least one messaging server, to said at least one sender, anticipated responses of said at least one particular recipient to said proposed communication request determined from a selection of said stored actual responses associated with at least one of said separate type of content appearing in said proposed communication request to said particular communication output interface specified for said separate type of response of said at least one actual response.

2. The method for distributing a communication based on reaction response according to claim 1, wherein said particular communication output interface comprises at least one from among an instant messaging interface, an electronic mail interface, a chat room interface, a telephony device interface, and a pager interface.

3. A method for anticipating responses to communication content, comprising:

delivering, using at least one messaging server that provides electronic communication service over a network to at least one particular recipient, a plurality of electronic messages from a plurality of separate senders to said at least one particular recipient;

receiving, at said at least one messaging server, at least one actual response specified by said at least one particular recipient to at least one separate type of content for each of said plurality of electronic messages by detecting a separate graphical display attribute selected by said at least one particular recipient to associate with each said at least one separate type of content within a display of each of said plurality of electronic messages, wherein each said separate graphical attribute represents at least one separate type of response from among a plurality of types of responses;

storing, in a database, by said at least one messaging server, said at least one actual response to said at least one separate type of content specified by said at least one particular recipient through each said separate graphical display attribute;

enabling said at least one messaging server to detect a proposed communication request from a particular sender for said at least one particular recipient;

specifying, by said at least one messaging server, only a selection of the at least one stored actual responses matching a particular type of content for output to said particular sender according to at least one output preference specifying the particular type content from among a plurality of types of content by said particular sender; and sending, by said at least one messaging server, to said particular sender anticipated responses of said at least one particular recipient to said proposed communication request determined from only said selection of the at least one stored actual responses associated with at least one of said separate type of content appearing within said proposed communication request.

\* \* \* \* \*